(12) United States Patent
Kutz et al.

(10) Patent No.: US 10,122,517 B2
(45) Date of Patent: Nov. 6, 2018

(54) METHODS FOR ESTIMATING REFERENCE SIGNAL RECEIVED POWER OF CELLULAR COMMUNICATION SIGNALS

(71) Applicant: Ceva D.S.P. Ltd., Herzlia Pituach (IL)

(72) Inventors: Gideon Kutz, Ramat Hasharon (IL); Noam Zach, Kiryat Ono (IL); Guy Keshet, Petah Tikva (IL); Kfir Bezalel, Holon (IL)

(73) Assignee: Ceva D.S.P. Ltd., Herzlia Pituach (IL)

( * ) Notice: Subject to any disclaimer, the term of this patent is extended or adjusted under 35 U.S.C. 154(b) by 265 days.

(21) Appl. No.: 14/982,526

(22) Filed: Dec. 29, 2015

(65) Prior Publication Data

US 2017/0187500 A1   Jun. 29, 2017

(51) Int. Cl.
| | |
|---|---|
| *H04L 5/00* | (2006.01) |
| *H04W 72/08* | (2009.01) |
| *H04W 24/10* | (2009.01) |
| *H04W 52/24* | (2009.01) |
| *H04B 17/327* | (2015.01) |
| *H04J 11/00* | (2006.01) |
| *H04L 25/02* | (2006.01) |
| *H04W 52/40* | (2009.01) |
| *H04B 17/309* | (2015.01) |
| *H04B 17/345* | (2015.01) |

(52) U.S. Cl.
CPC .......... *H04L 5/006* (2013.01); *H04B 17/327* (2015.01); *H04L 5/0007* (2013.01); *H04L 5/0048* (2013.01); *H04W 24/10* (2013.01); *H04W 52/244* (2013.01); *H04W 72/085* (2013.01); *H04B 17/309* (2015.01); *H04B 17/345* (2015.01); *H04J 11/005* (2013.01); *H04L 25/0204* (2013.01); *H04W 52/40* (2013.01)

(58) Field of Classification Search
None
See application file for complete search history.

(56) References Cited

U.S. PATENT DOCUMENTS

| | | |
|---|---|---|
| 8,837,301 B2 | 9/2014 | Krishnamurthy |
| 8,867,999 B2 | 10/2014 | Agrawal et al. |

(Continued)

FOREIGN PATENT DOCUMENTS

| | | |
|---|---|---|
| EP | 2688338 | 1/2014 |
| WO | WO 2012-047144 | 4/2012 |

(Continued)

OTHER PUBLICATIONS

NEC Group: "On CRS interference handling" 3GPP Draft, 3$^{rd}$ Generation Partnership Project, Moble Competence Center; Aug. 5, 2012, pp. 1-7. Retrieved from the Internet: URL: http://www.3gpp.org/ftp/tsg_ran/WG1_RL1/TSGR1_70/Docs/.

(Continued)

*Primary Examiner* — Jeffrey M Rutkowski
*Assistant Examiner* — Voster Preval
(74) *Attorney, Agent, or Firm* — Pearl Cohen Zedek Latzer Baratz LLP (57) ABSTRACT

Methods for RSRP estimation in LTE networks that perform interference cancellation are provided. In particular, a bias that is present during interference cancellation is account for in the RSRP estimation of a target cell.

16 Claims, 4 Drawing Sheets

(56) References Cited

U.S. PATENT DOCUMENTS

| | | | |
|---|---|---|---|
| 2008/0137723 A1* | 6/2008 | Liu | H04L 25/0232 |
| | | | 375/235 |
| 2011/0286346 A1 | 11/2011 | Barbieri et al. | |
| 2012/0329400 A1* | 12/2012 | Seo | H04J 11/005 |
| | | | 455/63.1 |
| 2015/0098440 A1 | 4/2015 | Yang et al. | |
| 2015/0109944 A1 | 4/2015 | Koike | |
| 2015/0124691 A1* | 5/2015 | Li | H04L 5/005 |
| | | | 370/312 |
| 2015/0131758 A1* | 5/2015 | Chen | H04B 1/1027 |
| | | | 375/340 |
| 2015/0296430 A1 | 10/2015 | Bakker et al. | |

FOREIGN PATENT DOCUMENTS

| | | | | |
|---|---|---|---|---|
| WO | WO-2015/127942 | | 9/2015 | |
| WO | WO-2015131393 A1 * | | 9/2015 | H04B 17/318 |

OTHER PUBLICATIONS

European Search Report of European Application No. EP 16 20 6625 dated May 30, 2017.

* cited by examiner

METHODS FOR ESTIMATING REFERENCE SIGNAL RECEIVED POWER OF CELLULAR COMMUNICATION SIGNALS

FIELD OF THE INVENTION

The invention relates generally wireless communications systems. In particular, the invention relates to estimating a Reference Signal Received Power (RSRP) of a target cell in a Long Term Evolution (LTE) network by estimating and removing bias.

BACKGROUND OF THE INVENTION

In general, current cellular communications systems allow for cellular devices to connect to high-speed data networks using radio waves as the transmission medium. For example, Universal Mobile Telecommunications Systems (UMTS) can provide broadband applications, internet access, telephone access services, televisions service access and/or mobile telephone services.

Communication over UMTS requires transmission over a radio spectrum, which is a medium that is shared between multiple technologies. In some instances, these technologies can be interfering. Standards were developed to, for example, ensure interoperability between equipment from multiple vendors and aims to ensure that the allocated spectrum is used efficiently.

One such widely adopted standard is the $3^{rd}$ Generation Partnership Project (3GPP) standard. The 3GPP standard has had many revisions, including an evolution into the Long-Term Evolution (LTE) standards. The LTE standards also continue to evolve, such that there are multiple releases, one of which is the LTE standards Release 11 (e.g., Rel-11).

In cellular communication, a user equipment (UE), for example, a mobile handset, can be required to measure base station power and signal quality of neighboring base stations and report those measurements to its serving base station. These measurements can be used by networks to, for example, manage cell handover. These measurements can have a direct impact on the overall network capacity.

In LTE the UE can report two parameters: Reference Signal Received Power (RSRP) and Reference Signal Received Quality (RSRQ). These two parameters can be measured using sequence of pilots that are typically unique per cell. The sequence of pilots is typically known as Cell specific Reference Signal (CRS).

Currently, cellular communications systems environments are dense and cell coverage areas are small, as demand for cellular service grows. Denser cellular environments and smaller cells can reduce the accuracy of measuring RSRP and RSRQ, due to, for example increased interference.

Rel-11 of the LTE standards attempts to improve accuracy of measuring RSRP and RSRQ by requiring interference cancellation of CRS from neighboring cells. One current method for interference cancellation of CRS from neighboring cells includes performing a joint estimation of a target cell's (e.g., the cell to be measured) channel response and an interfering cell's channel response, followed by averaging of the target cell channel energy over a measurement period.

One difficulty with this current method is that it can require a high computational power, due to, for example, filter coefficients used to estimate the channel response being dependent on a cross correlation of the target cell's and interfering cell's CRS patterns. The cross correlation can vary between orthogonal frequency-division multiplexing (OFDM) symbols and sub-frames, resulting in a matrix inversion calculation for every OFDM symbol. The increase in computation power necessary for joint estimation scan cause a UE to completely fail to function, cause a slowdown of other functions by the UE, the UE to need a bigger processing chip and/or quicker power loss.

Another current method of interference cancellation is serial interference cancellation. In serial cancellation a dominant interfering cell channel is estimated, reconstructed, and subtracted from a received signal. After the serial interference cancellation, the RSRP of the target cell can be estimated. One difficulty with serial interference cancellation is that it can lead to an underestimation of the RSRP of the target cell due to, for example, failure of the dominant interfering cell channel estimation to account for a contribution of the target cell in the received communication signal. Without accounting for the target cell, some of the energy of the target cell (e.g., the projection of the serving cell on the interference cell) is attributed to the interfering cell. Lack of accounting for the target cell can result in a power of the interfering cell being overestimated (e.g., due to a bias primarily caused by the contribution of the target cell in the interfering cell channel estimation), and thus underestimation of the target cell.

Therefore, it is desirable to perform interference cancellation when estimating RSRP with a low computation power. It is also desirable to account for interference cancellation bias in the RSRP estimation.

SUMMARY OF THE INVENTION

One advantage of the invention is that it allows for interference cancellation when estimating RSRP with a low computation power. Another advantage of the invention is that it accounts for interference cancellation bias when estimating RSRP.

In one aspect, the invention involves a method for Reference Signal Received Power (RSRP) estimation of a target cell in Long Term Evolution (LTE) network. The method involves receiving a cellular communication signal transmitted over the LTE network. The method also involves determining a first channel estimation of an interference cell of the LTE network based on the cellular communication signal. The method also involves performing an interference cancellation based on the cellular communication signal and the first channel estimation. The method also involves determining a second channel estimation of the target cell based on the cellular communication signal after interference cancellation. The method also involves determining a bias based on the second channel estimation. The method also involves determining a RSRP estimation of the target cell based on the second channel estimation and the bias.

In some embodiments, the bias is a bias matrix and determining the bias further comprises determining an expectation value of the bias matrix. In some embodiments, the bias is a bias matrix and determining the bias further comprises using a Neumann series approximation. In some embodiments, the method involves determining the bias further comprises retrieving the bias from a computer memory.

In some embodiments, the method involves determining the bias further comprises modifying the retrieved bias. In some embodiments, the method involves determining the RSRP estimation is further based on a noise factor. In some embodiments, the method involves retrieving the noise factor from a computer memory. In some embodiments, the method involves modifying the retrieved noise factor.

In some embodiments, the pilot symbols of the target cell and pilot symbols of the interfering cell overlap. In some embodiments, the target cell and the interfering cell have an overlapping area of cellular coverage. In some embodiments, the cellular communication signal is an orthogonal frequency-division multiplexing (OFDM) signal.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

DETAILED DESCRIPTION

Generally, a user equipment (UE) receives a cellular communications signal from a target cell (e.g., first base station) and an interference cell (e.g., a second base station) of a cellular communications Long Term Evolution (LTE) network. The UE determines a first channel estimation of the interference cell based on the cellular communications signal. The UE performs an interference cancellation based on the cellular communication signal and the first channel estimation. The UE determines a second channel estimation of the target cell based on the cellular communication signal after interference cancellation. The UE determines a bias from the second channel estimation (e.g., the bias caused by contribution of the target cell in the interfering cell channel estimation). The UE determines an RSRP estimate of the target cell based on the second channel estimation and the bias.

Figure 1:
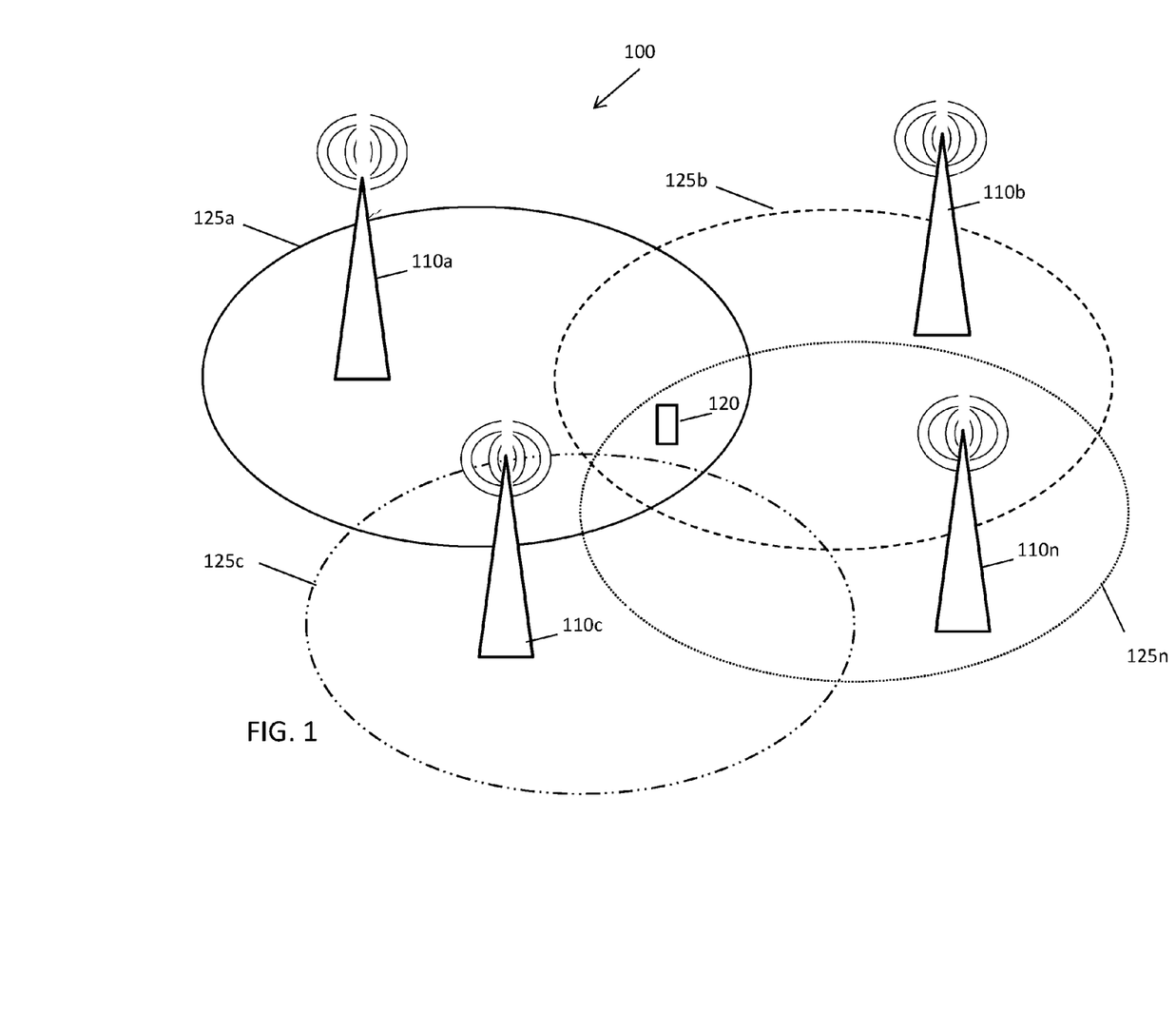
FIG. 1 is a diagram of an exemplary cellular communications system, according to an illustrative embodiment of the invention.

FIG. 1 is a diagram of an exemplary cellular communications system 100, according to an illustrative embodiment of the invention. The cellular communications system 100 includes base stations 110a, 110b, 110c, . . . , 110n, generally base stations 110 and a user equipment (UE) 120. Each base station, 110a, 110b, 110c, 110n, has a corresponding coverage area shown in FIG. 1 as cellular coverage area 125a, 125b, 125c, . . . , 125n, respectively, generally cellular coverage areas 125.

The cellular coverage areas 125 can overlap. The base stations 110 can transmit cellular communications signals to the UE 120. The UE can transmit cellular communication signals to the base stations 110.

The UE 120 is configured to receive cellular communication signals from one or more of the base stations 110 when the UE 120 is within a respective cellular coverage area 125. The UE 120 is configured to report a Reference Signal Received Power (RSRP) of one or more of the base stations 125. The UE 120 can be configured according to LTE standards. The UE 120 can be configured in accordance with any cellular communication standards as is known in the art.

The cellular communications system 100 can be a UMTS operating with the Rel-11 LTE standards. The UE 120 can be a smart phone, a tablet device, a car phone, a computer, or any device capable of receiving communication signals over a UMTS network.

As is apparent to one of ordinary skill in the art, the base stations 125 and their corresponding cellular coverage areas 125 are not to scale and are illustrative only.

During operation, the UE 120 receives a request for an RSRP from one of the base stations 110, for example, base station 110a. Base station 110a can be denoted as the target cell. In addition to being within the cellular coverage area 125a covered by the target cell (e.g., base station 110a) the UE 120 is also within the cellular coverage areas 125b, 125c, and 125n, covered by base stations 110b, 110c, and 110n, respectively. Cellular communication signals received by the UE 120 in this overlapping coverage area can have contributions not only from the target cell (e.g., base station 110a), but also from base stations 110b, 110c, and 110n, (e.g., interfering cells).

One of the interfering cells (e.g., base stations 110b, 110c, and 110n) can be a dominate interfering cell (e.g., base station 110b), and thus its contribution to the cellular communication signals received by the UE 120 can be cancelled from the cellular communications signal received by the UE 120. One dominant interfering cell or multiple interfering cells can be provided to the UE 120 by the network. Upon receipt of multiple interference cells, the UE 120 can perform an approximate estimate of their power by, for example, using a correlation as is known in the art. Based on the correlation, the UE 120 can determine which of the received interfering cells is dominant.

Ignoring the contribution of interference from the other interfering cells (e.g. 110c, and 110n) can cause an unwanted bias in the RSRP after cancelling the interference from the dominate interfering cell 110a. The bias can cause the RSRP estimation of the target cell to be erroneous.

The RSRP estimation performed by the UE 120 can take into account the bias to provide an accurate RSRP measurement, despite the interference contribution of the other interference cells 110c and 110n.

As is apparent to one of ordinary skill in the art that FIG. 1 is exemplary only and that there are many configurations in a cellular network that can cause a UE 120 to receive cellular communications signals with interference. For example, the cellular communication systems 100 can include any number of base stations and any number of UE's as is known in the art. Size of the cell coverage area can vary based on properties of the base station.

Figure 2:
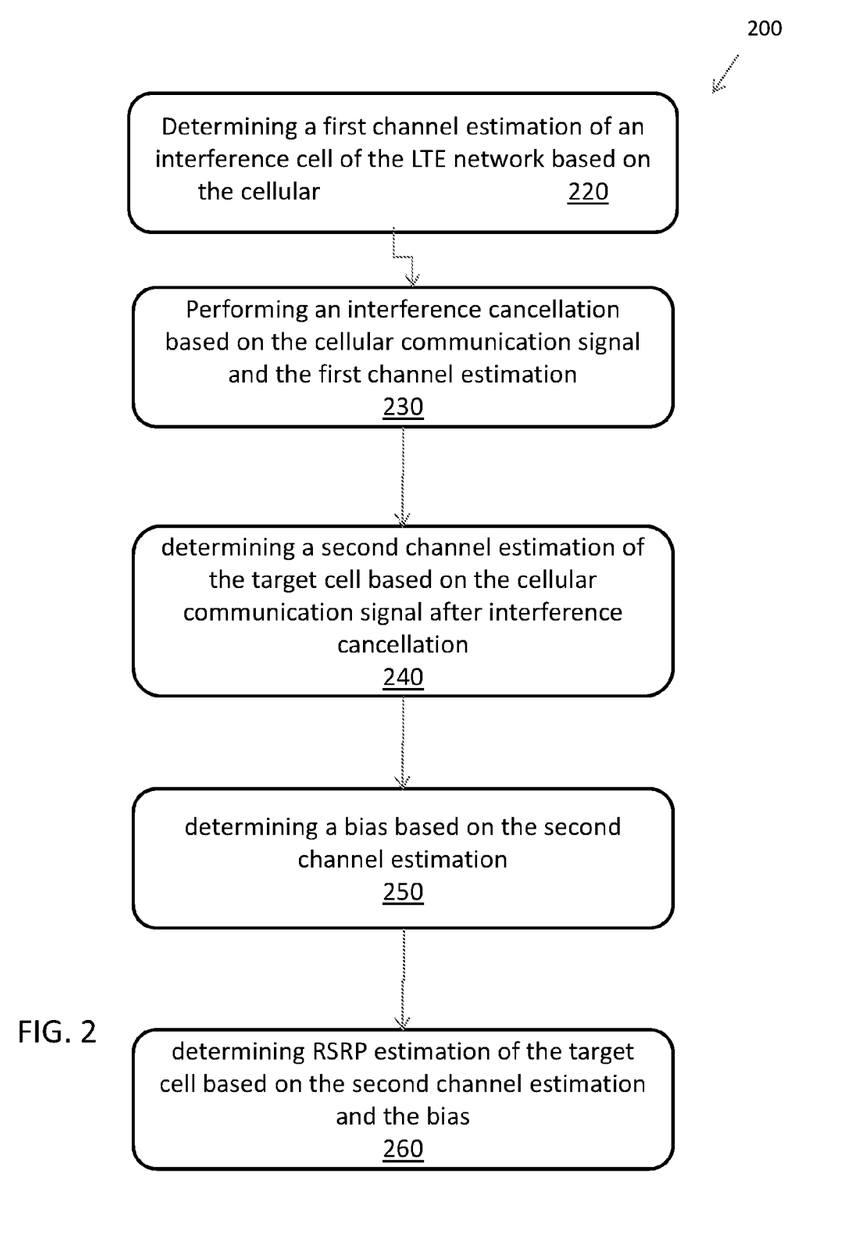
FIG. 2 is a flow diagram illustrating a method for a Reference Signal Received Power (RSRP) estimate of a target cell in Long Term Evolution (LTE) networks, according to an illustrative embodiment of the invention.

FIG. 2 a flow diagram 200 illustrating a method for a Reference Signal Received Power (RSRP) estimate of a target cell (e.g., base station 110a) in Long Term Evolution (LTE) networks, according to an illustrative embodiment of the invention.

The method involves receiving (e.g., receiving by the UE 120, as described above in FIG. 1) a cellular communication signal transmitted over the LTE network (e.g., cellular communications network 110, as described above in FIG. 1). The cellular communication signal $y_i$ can be determined as follows:

$$y_i = [y_{0,i}, \ldots, y_{N-1,i}]^T \quad \text{EQN. 1}$$

where N is a size of an observation vector of the cellular communication signal, and i is the i-th orthogonal frequency-division multiplexing (OFDM) symbol.

A Fast Fourier Transform (FFT) of the received cellular communication signal $y_i$ in the i-th orthogonal frequency-division multiplexing (OFDM) can be follows:

$$y_i = C_{0,i} F_0 h_{0,i} + C_{1,i} F_1 h_{1,i} + n_i, \qquad \text{EQN. 2}$$

where $C_{0,i}$ is a Cell specific Reference Signal (CRS) for the target cell, $F_0$ is a modified version of the FFT for the target cell, and $h_{0,i}$ is a channel domain impulse response sampled at a bandwidth sample rate of the cellular communications signal for the target cell, $C_{1,i}$ is a CRS for an interference cell of the LTE network, $F_1$ is a modified version of the FFT for the interference cell, and $h_{1,i}$ is a channel domain impulse response sampled at the bandwidth sample rate of the cellular communications signal for the interference cell.

The method involves determining a first channel estimation $\tilde{h}_{1,i}$ of an interference cell (e.g., interference cell 110b, as described above in FIG. 1) of the LTE network based on the cellular communication signal (Step 220). The first channel estimation $\tilde{h}_{1,i}$ can be determined as follows:

$$\tilde{h}_{1,i} = F_1^\dagger C_{1,i}^H y_i \qquad \text{EQN. 3}$$

where $C_{1,i}^H$ is the CRS for an interference cell of the LTE network, H is a Hermitian transpose operator, and where $F_1^\dagger$ can be determined as follows:

$$F_1^\dagger = (F_1^H F_1)^{-1} F_1^H \qquad \text{EQN. 4}$$

The method also involves performing an interference cancellation Ic based on the cellular communication signal $y_i$ and the first channel estimation $\tilde{h}_{1,i}$ (Step 230). The interference cancellation Ic can be determined as follows:

$$Ic = y_i - C_{1,i} F_1 \tilde{h}_{1,i} \qquad \text{EQN. 5}$$

The method also involves determining a second channel estimation $\tilde{h}_{0,i}$ of the target cell based on the cellular communication signal after interference cancellation (Step 240). The second channel estimation $\tilde{h}_{0,i}$ can be determined as follows:

$$\tilde{h}_{0,i} = F_0^\dagger C_{0,i}^H (I_c); \qquad \text{EQN. 6}$$

The method also involves determining a bias based on the second channel estimation (Step 250). The bias can be a matrix. The bias matrix $B_i$ can be determined as follows:

$$\tilde{h}_{0,i} = h_{0,i} - F_0^\dagger C_{0,i}^H C_{1,i} F_1 F_1^\dagger C_{1,i}^H C_{0,i} F_0 h_{0,i} + \dot{n}_i \qquad \text{EQN. 7}$$

$$F_0^\dagger \text{ is the } F_0^\dagger = (F_0^H F_0)^{-1} F_0^H \qquad \text{EQN. 8}$$

$$\hat{h}_{0,i} = (I - B_i)^1 h_{0,i} + (I - B_i)^{-1} \dot{n}_i \qquad \text{EQN. 9}$$

where $C_{0,i}^H$ is the CRS for an interference cell of the LTE network and $\dot{n}_i$ is a filtered noise term.

The method also involves determining RSRP estimation f the target cell based on the second channel estimation and the bias (Step 260). The RSRP estimation can be determined as follows:

$$RSRP = \frac{1}{M} \sum_{i=0}^{M-1} |F_0 \hat{h}_{0,i}|^2 - g\sigma^2 \qquad \text{EQN. 10}$$

where M is a predefined number of symbols in the cellular communication signal that, g is an expectation value of the filtered noise term $\dot{n}_i$, and where $\sigma^2$ is noise power. The RSRP showing the bias can be expressed as follows:

$$RSRP = \frac{1}{M} \sum_{i=0}^{M-1} \tilde{h}_{0,1}^{-H} (I - B_i)^{-H} F_0^H F_0 (I - B_i)^{-1} \tilde{h}_{0,i} - g\sigma^2 \qquad \text{EQN. 11}$$

In some embodiments, determining the RSRP involves estimating $(I-B_i)$. In some embodiments, estimating $(I-B_i)^{-1}$ reduces the computational complexity of RSRP. In some embodiments, a Neumann series approximation is used to estimate $(I-B_i)^{-1}$. In some embodiments, the Neumann series approximation is used to estimate $(I-B_i)^{-1}$ where $\lim_{k \to \infty} B^k = 0$. In some embodiments, $(I-B_i)^{-1}$ can be determined as follows:

$$(I-B_i)^{-1} = \Sigma_{k=0}^\infty B^k \qquad \text{EQN. 12}$$

In some embodiments, $(I-B_i)^{-1}$ can be determined by summing the first two elements of the series in EQN. 12, such that $(I-B_i)^{-1}$ can be determined as follows:

$$(I-B_i)^{-1} \approx I + B_i \qquad \text{EQN. 13}$$

In some embodiments, the RSRP can be determined applying EQN. 13 to EQN. 11, such that the RSRP can be determined as follows:

$$RSRP = \frac{1}{M} \sum_{i=0}^{M-1} (F_0^H F_0 + 2\text{Re}(B_i^H F_0^H F_0)) \tilde{h}_{0,i} - g\sigma^2 \qquad \text{EQN. 14}$$

where $\text{Re}(B_i^H F_0^H F_0)$ denotes the real part of $B_i^H F_0^H F_0$.

In some embodiments, $B_i$ is determined based on its expectation, as follows:

$$\overline{B} E(B_i) = F_0^\dagger \text{diag}(F_1 F_1^\dagger) F_0 \qquad \text{EQN. 15}$$

where diag denotes the diagonal matrix with its main diagonal equal to the main diagonal of $F_1 F_1^\dagger$. The expectation found in EQN. 15 is the expectation over the CRS patterns cross correction for the case where there is an independent identical distribution of the CRS.

In some embodiments, the RSRP can be determined based on an expectation of a contribution of bias to the RSRP. In this manner, a contribution of bias to the computation complexity of the RSRP determination can be negligible, in comparison to a typical computation complexity for determining RSRP that does not account for bias. In some embodiments, the RSRP can be determined by applying the expectation value in EQN. 15 to EQN. 13, such that the RSRP can be determined as follows:

$$RSRP = \frac{1}{M} \sum_{i=0}^{M-1} \left( F_0^H F_0 + 2\text{Re}(\overline{B}^H F_0^H F_0) \right) \tilde{h}_{0,i} - g\sigma^2 \qquad \text{EQN. 16}$$

where $B_i^H F_0^H F_0 B_i$ in EQN. 13 is ignored, due to, for example, B being relatively small and therefore its squared term negligible.

In some embodiments, $F_0^H F_0 + 2\text{Re}(\overline{B}^H F_0^H F_0)$ of EQN. 16 is determined off-line. In some embodiments, a value for $F_0^H F_0 + 2\text{Re}(\overline{B}^H F_0^H F_0)$ is stored in computer memory and retrieved during the RSRP determination. In some embodiment, a value for $F_0^H F_0 + 2\text{Re}(\overline{B}^H F_0^H F_0)$ is stored in a lookup table.

In some embodiments, the value for $F_0^H F_0 + 2\text{Re}(\overline{B}^H F_0^H F_0)$ of EQN. 16 is further modified upon retrieval from memory. In some embodiments, the value for $F_0^H F_0 + 2\text{Re}(\overline{B}^H F_0^H F_0)$ of EQN. 16 is modified in according to corresponding channel tap positions and/or according to a delay spread of the channel. In some embodiments, the value for $F_0+2Re(\bar{B}^H F_0^H F_0)$ of EQN. 16 is modified with a low rate:

In some embodiments, the expectation value of the filtered noise term $\dot{n}_i$ is determined as follows:

$$g = \Sigma_{i=0}^{M-1} Tr(D_i^H G_i D_i) \qquad \text{EQN. 20}$$

where D can be determined as follows:

$$D = F_0^\dagger C_{0,i}^H (I - C_{1,i} F_1 F_1^\dagger C_{1,i}^H) \qquad \text{EQN. 21}$$

where $G_i$ can be determined as follows:

$$G_i = F_0^H F_0 + 2Re(F_0^H F_0 B_i) \qquad \text{EQN. 22}$$

In some embodiments, expectation value of the filtered noise term can be determined based on an expectation of a contribution of bias to filtered noise. In this manner, a contribution of bias to the computation complexity of the filtered noise (and thus to the RSRP) determination can be negligible, in comparison to a typical computation complexity for determining the filtered noise (and thus the RSRP) without accounting for bias. In some embodiments, the filtered noise can be determined by applying the expectation value in EQN. 15 to EQN. 12, such that the filtered noise can be determined as follows:

$$g = M \cdot Tr(F_0^{\dagger H} GF_0^\dagger - 2Re(F_0^{\dagger H} GF_0^\dagger \text{diag}(F_1 F_1^\dagger)) + M \cdot Tr((F_1 F_1^\dagger)^H \text{diag}(F_0^{\dagger H} GF_0^\dagger) F_1 F_1^\dagger) \qquad \text{EQN. 23}$$

where G can be determined as follows:

$$G = F_0^H F_0 + 2Re(\bar{B} F_0^H F_0) \qquad \text{EQN. 24}$$

In some embodiments, the determination of EQN. 24 and 24 is determined off-line. In some embodiments, the value for EQN. 23 is stored in computer memory and retrieved during the RSRP determination. In some embodiments, a value for EQN. 23 is stored in a lookup table.

In some embodiments, the value for EQN. 24 is further modified upon retrieval from memory. In some embodiments, the value for EQN. 24 is modified based upon channel tap positions, in accordance with a delay spread of the channel, or any combination thereof. In some embodiments, the value for EQN. 24 is modified in low rate.

Figure 3A:
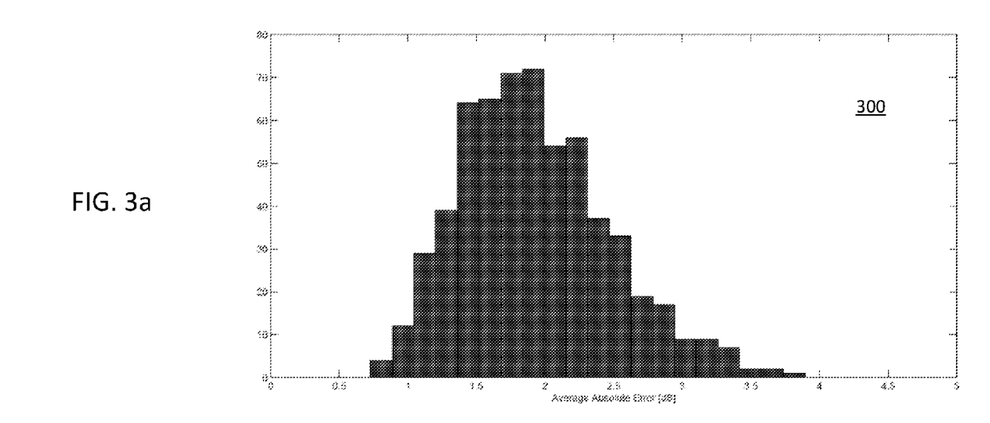
FIG. 3a is a graph illustrating an RSRP measurement histogram, in accordance with the prior art.
Figure 3B:
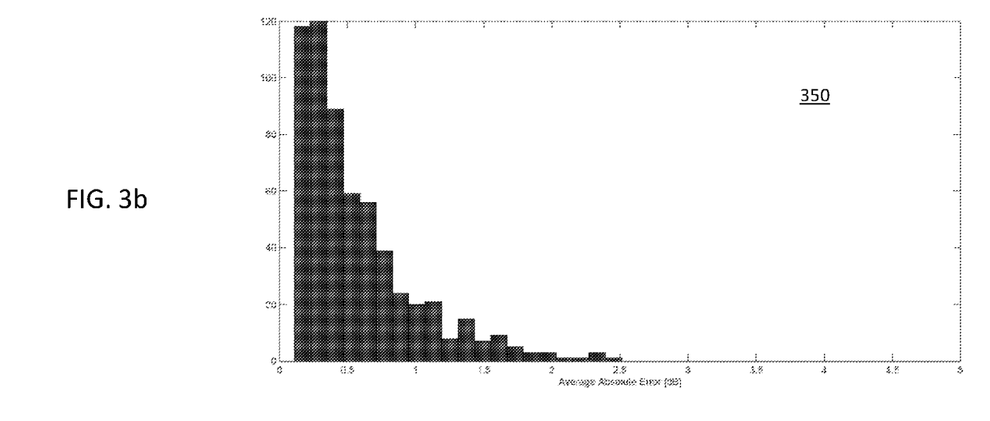
FIG. 3b is a graph illustrating an RSRP measurement histogram, in accordance with an illustrative embodiment of the invention.

FIG. 3a is a graph 300 illustrating an RSRP measurement histogram, in accordance with the prior art. FIG. 3b is a graph 350 illustrating an RSRP measurement histogram, in accordance with an illustrative embodiment of the invention. In FIG. 3a and FIG. 3b, an absolute error value of the RSRP is presented over 602 cell identity combinations. For the examples of FIG. 3a and FIG. 3b, the target and interfering cells have colliding CRS, the interfering cell timing is delayed by 3 micro second compared to the target cell, and the channel estimation filters uses 12 taps per estimated sub-carrier. In addition, a single CRS port is transmitted by each cell, signals propagate through 2 AWGN channels and are received with 2 RX antennas at the UE. Estimated RSRP values from 10 sub-frames, 2 RX antennas and 4 OFDM symbols per measured sub-frame are non-coherently averaged to calculate RSRP for a measurement period of 200 ms. Relative powers of the interfering cell, target cell and AWGN are 0 dB, −4 dB, −6 dB, respectively.

In FIG. 3a the absolute error value of the RSRP are shown where the RSRP is determined without accounting for bias. The error values in FIG. 3a range from approximately 0.5 dB to approximately 3.5 dB with an average of approximately 1.9 dB. In FIG. 3b the absolute error value of the RSRP are shown where the RSRP is determined accounting for bias, for example, using the method described in FIG. 2 above. The error values in FIG. 3b range from approximately 0.2 dB to 2.0 dB with an average error of 0.6 dB.

Figure 4:
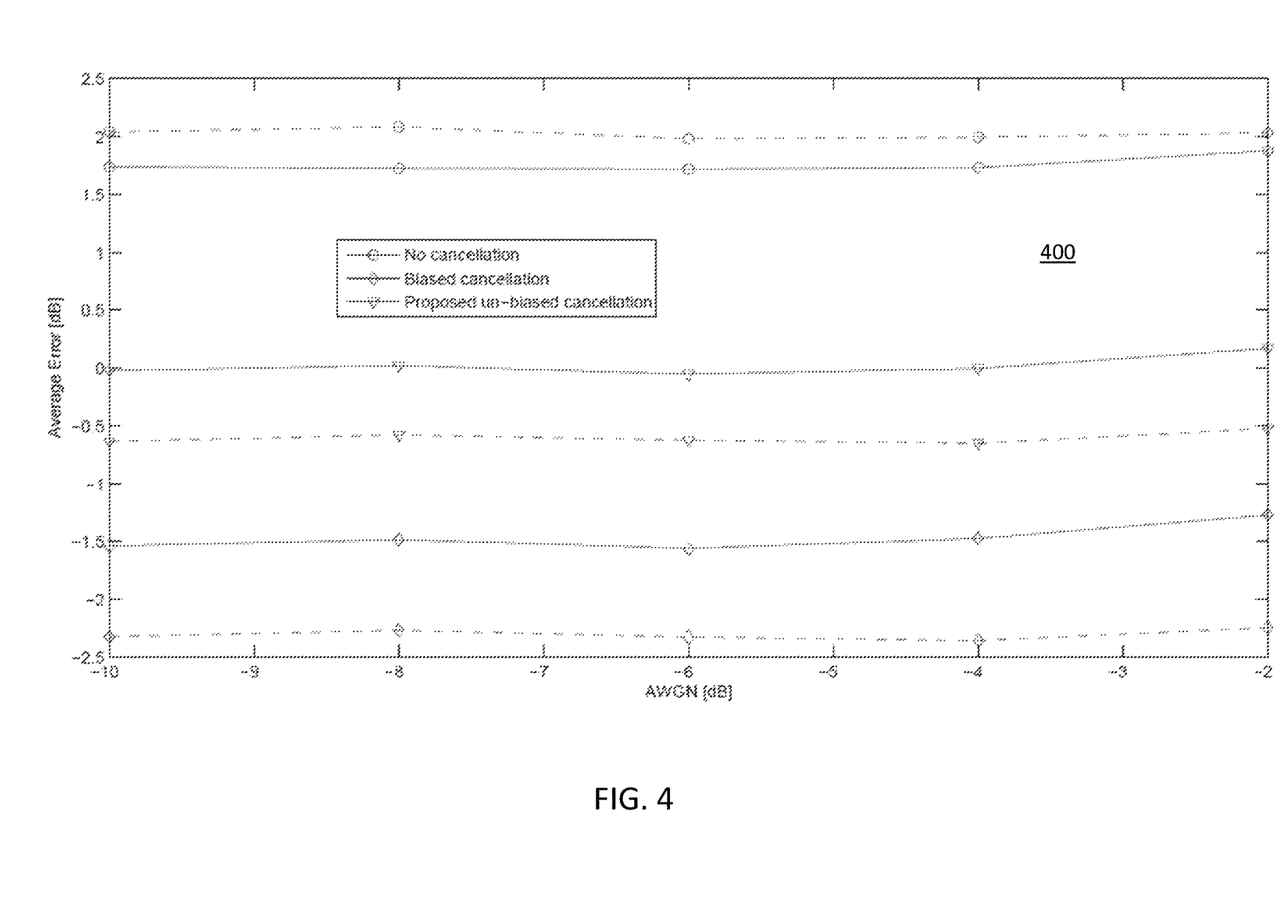
FIG. 4 is a graph illustrating average RSRP error versus Signal to Noise Ratio, in accordance with illustrative embodiments of the invention.

FIG. 4 is a graph illustrating average RSRP error versus Signal to Noise Ratio, in accordance with illustrative embodiments of the invention. In particular, FIG. 4 shows the RSRP measurement error for a RSRP measurement where interference cancellation is not performed, a RSRP measurement where interference cancellation is performed but the RSRP determination does not account for bias, and a RSRP measurement where interference cancellation is performed and the RSRP determination does account for bias (e.g., the RSRP as determined above in accordance with FIG. 2), for two different target/interference cell combinations. As can be seen in FIG. 4, for both of the target/interference cell combinations, the average RSRP error is significantly improved when interference cancellation is performed and the RSRP determination takes the bias into account.

Method steps can be performed by one or more programmable processors (e.g., on a mobile device) executing a computer program to perform functions of the invention by operating on input data and generating output. Method steps can also be performed by an apparatus and can be implemented as special purpose logic circuitry. The circuitry ca for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

The User Equipment can include any computing device, for example, a computer, a computer with a browser device, an IP phone, a mobile device (e.g., cellular phone, personal digital assistant (PDA) device, laptop computer, electronic mail device), and/or other communication devices. The computing device can be, for example, one or more computer servers. The computer servers can be, for example, part of a server farm.

The computer storage can be, for example, a random access memory (RAM) module, a read only memory (ROM) module, a computer hard drive, a memory card (e.g., universal serial bus (USB) flash drive, a secure digital (SD) flash card), a floppy disk, and/or any other data storage device. Information stored on a storage module can be maintained, for example, in a database (e.g., relational database system, flat database system) and/or any other logical information storage mechanism.

The above described networks can be implemented in a packet-based network, a circuit-based network, and/or a combination of a packet-based network and a circuit-based network. Packet-based networks can include, for example, the Internet, carrier internet protocol (IP) network (e.g., local area network (LAN), wide area network (WAN), campus area network (CAN), metropolitan area network (MAN), home area network (HAN), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth®, code-division multiple access (CDMA) network, time division multiple access (TDMA) network, global system for mobile communications (GSM) network), and/or other circuit-based networks.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method for performing cellular communication in a Long Term Evolution (LTE) network, the method comprising:

receiving a request for a reference signal received power (RSRP) estimation from a first base station;

receiving a cellular communication signal $y_i$ from the first base station and at least one interference base station transmitted over the LTE network, wherein $y_i=[y_{0,i}, \ldots, y_{N-1,i}]^T$, N is a size of an observation vector of the cellular communication signal, i is the i-th orthogonal frequency-division multiplexing (OFDM) symbol, wherein the received cellular communication signal after a Fast Fourier Transform (FFT) in the i-th orthogonal frequency-division multiplexing (OFDM symbol) is applied is defined by $y_i=C_{0,i}F_0h_{0,i}+C_{1,i}F_1h_{1,i}+n_i$, wherein $C_{0,i}$ is a Cell specific Reference Signal for the target first base station, $F_0$ is a modified version of the FFT for the first base station, and $h_{0,i}$ is a channel domain impulse response sampled at a bandwidth sample rate of the cellular communications signal for the first base station, $C_{1,i}$ is a Cell specific Reference Signal for a second base station of the LTE network, $F_1$ is a modified version of the FFT for the second base station, and $h_{1,i}$ is a channel domain impulse response sampled at the bandwidth sample rate of the cellular communications signal for the second base station;

determining a first channel estimation of $\tilde{h}_{1,i}$ the second base station of the LTE network based on the cellular communication signal, wherein $\tilde{h}_{1,i}=F_1^\dagger C_{1,i}^H y_i$, wherein $F_1^\dagger=(F_1^H F_1)^{-1}F_1^H$, wherein $C_{1,i}^H$ the Cell specific Reference Signal for the second base station of the LTE network and H is a Hermitian transpose operator;

performing an interference cancellation Ic based on the cellular communication signal and the first channel estimation, wherein $Ic=y_i-C_{1,i}F_1\tilde{h}_{1,i}$;

determining a second channel estimation $\tilde{h}_{0,i}$ the first base station based on the cellular communication signal after interference cancellation, wherein $\tilde{h}_{0,i}=F_0^\dagger C_{0,i}^H(I_c)$;

determining a bias matrix $B_i$ based on the second channel estimation, wherein $\tilde{h}_{0,i}=h_{0,i}-F_0^\dagger C_{0,i}^H F_1 F_1^\ C_{1,i}^H C_{0,i} F_0 h_{0,i}+\dot{n}_i$, wherein $F_0^\dagger$ is the $F_0^\dagger=(F_0^H F_0)^{-1}F_0^H$, wherein $C_{0,i}^H$ is the Cell specific Reference Signal for the second base station of the LTE network, and $\dot{n}_i$ is a filtered noise term, wherein $\hat{h}_{0,i}$ is expressed as, $\hat{h}_{0,i}=(I-B_i)^{-1}\tilde{h}_{0,i}=h_{0,i}+(I-B_i)^{-1}\dot{n}_i$;

determining RSRP estimation of the first base station based on the second channel estimation and the bias, wherein $RSRP=1/M\Sigma_{i=0}^{M-1}|F_0\hat{h}_{0,i}|^2-g\sigma^2$, wherein M is a predefined number of symbols in the cellular communication signal, g is an expectation value of the filtered noise term $\dot{n}_i$, $\sigma^2$ is noise power, wherein RSRP is expressed as $RSRP=1/M\Sigma_{i=0}^{M-1}\tilde{h}_{0,1}^{-H}(I-B_i)^{-H}F_0^h F_0(I-B_i)^{-1}\tilde{h}_{0,i}-g\sigma^2$;

reporting the RSRP of the first base station; and
managing cell handover based on the RSRP.

2. The method of claim 1 wherein the bias is a bias matrix and determining the bias further comprises determining an expectation value of the bias matrix.

3. The method of claim 1 wherein the bias is a bias matrix and determining the bias further comprises using a Neumann series approximation.

4. The method of claim 1 wherein determining the bias further comprises retrieving the bias from a computer memory.

5. The method of claim 4 wherein determining the bias further comprises modifying the retrieved bias.

6. The method of claim 1 wherein determining the RSRP estimation is further based on a noise factor.

7. The method of claim 6 further comprising retrieving the noise factor from a computer memory.

8. The method of claim 7 further comprising modifying the retrieved noise factor.

9. The method of claim 1 wherein pilot symbols of the target cell and pilot symbols of the interfering cell overlap.

10. The method of claim 1 wherein the target cell and the interfering cell have an overlapping area of cellular coverage.

11. The method of claim 1 wherein the cellular communication signal is an orthogonal frequency-division multiplexing (OFDM) signal.

12. A method for performing cellular communication in a in Long Term Evolution (LTE) network, the method comprising:

receiving a request for a reference signal received power (RSRP) estimation from a target cell;

receiving a cellular communication signal $y_i$ transmitted over the LTE network, wherein $y_i=[y_{0,i}, \ldots, y_{N-1,i}]^T$, N is a size of an observation vector of the cellular communication signal, i is the i-th orthogonal frequency-division multiplexing (OFDM) symbol, wherein the received cellular communication signal after the Fast Fourier Transform (FFT) in the i-th orthogonal frequency-division multiplexing (OFDM symbol) is applied is defined by $y_i=C_{0,i}F_0h_{0,i}+C_{1,i}F_1h_{1,i}+n_i$, wherein $C_{0,i}$ is a Cell specific Reference Signal for the target cell, $F_0$ is a modified version of the FFT for the first base station, and $h_{0,i}$ is a channel domain impulse response sampled at a bandwidth sample rate of the cellular communications signal for the first base station, $C_{1,i}$ is a Cell specific Reference Signal for a second base station of the LTE network, $F_1$ is a modified version of the FFT for the second base station, and $h_{1,i}$ is a channel domain impulse response sampled at the bandwidth sample rate of the cellular communications signal for the interference cell;

determining a first channel estimation of $\tilde{h}_{1,i}$ of the interference cell, wherein $\tilde{h}_{1,i}=F_1^\dagger C_{1,i}^H y_i$,
wherein $F_1^\dagger=(F_1^H F_1)^{-1}F_1^H$, wherein $C_{1,i}^H$ the Cell specific Reference Signal for the second base station of the LTE network and H is a Hermitian transpose operator;

performing an interference cancellation Ic, wherein $Ic=y_i-C_{1,i}F_1\tilde{h}_{1,i}$;

determining a second channel estimation $\tilde{h}_{0,i}$ the interference cell, wherein $\tilde{h}_{0,i}=F_0^\dagger C_{0,i}{}^H(I_c)$;

determining a bias matrix $B_i$, wherein $\tilde{h}_{0,i}=h_{0,i}-F_0^\dagger C_{0,i}{}^H F_1 F_1 \backslash C_{1,i}{}^H C_{0,i} F_0 h_{0,i}+\dot{n}_i$, wherein $F_0^\dagger$ is the $F_0^\dagger=(F_0^H F_0)^{-1}F_0{}^H$, wherein $C_{0,i}{}^H$ is the Cell specific Reference Signal for an interference cell of the LTE network, and $\dot{n}_i$ is a filtered noise term, wherein $\hat{h}_{0,i}$ is expressed as, $\hat{h}_{0,i}=(I-B_i)^{-1}=h_{0,i}+(I-B_i)^{-1}\dot{n}_i$;

determining RSRP estimation of the target cell, wherein $$RSRP = \frac{1}{M}\sum_{i=0}^{M-1}\left|F_0\hat{h}_{0,i}\right|^2 - g\sigma^2,$$

wherein M is a predefined number of symbols in the cellular communication signal, g is an expectation value of the filtered noise term $\dot{n}_i$, $\sigma^2$ is noise power, wherein RSRP is expressed as $$RSRP = \frac{1}{M}\sum_{i=0}^{M-1}\tilde{h}_{0,1}^H(I-B_i)^{-H}F_0^h F_0(I-B_i)^{-1}\tilde{h}_{0,i} - g\sigma^2;$$

reporting the RSRP of the first base station.

13. The method of claim 12 further comprising:
approximating $(I-B_i)^{-H}$ to $(I+B_i)^H$ based on a first and second element of a Neumann series approximation of $B_i$.

14. The method of claim 13 wherein determining the RSRP further comprises:
determining an expectation value of $B_i$
wherein $\bar{B}=E(B_i)=F_0^\dagger \text{diag}(F_1 F_1^\dagger)F_0$; and
replacing $B_i$ with the expectation value such that, $$RSRP = \frac{1}{M}\sum_{i=0}^{M-1}\left(F_0^H F_0 + 2Re(\bar{B}^H F_0^H F_0)\right)\tilde{h}_{0,i} - g\sigma^2.$$

15. The method of claim 12 further comprising ignoring $B_i^H F_0^H F_0 B_i$.

16. The method of claim 12 wherein determining the expectation value of the filtered noise term further comprises:

$g=M\cdot Tr(F_0^{\dagger H}GF_0^\dagger - 2Re(F_0^{\dagger H}GF_0^\dagger\text{diag}(F_1 F_1^\dagger))+M\cdot Tr((F_1 F_1^\dagger)^H\text{diag}(F_0^{\dagger H}GF_0^\dagger)F_1 F_1^\dagger)$ wherein $G=F_0^H F_0+2Re(\bar{B}^H F_0^H F_0)$.

* * * * *

UNITED STATES PATENT AND TRADEMARK OFFICE
CERTIFICATE OF CORRECTION

PATENT NO. : 10,122,517 B2
APPLICATION NO. : 14/982526
DATED : November 6, 2018
INVENTOR(S) : Gideon Kutz et al.

It is certified that error appears in the above-identified patent and that said Letters Patent is hereby corrected as shown below:

In the Specification

In Column 9, Lines 57-58, please replace "$\tilde{h}_{0,i} = h_{0,i} - F_0^\dagger C_{0,i}^H F_1 F_1^` C_{1,i}^H C_{0,i} F_0 h_{0,i} + \dot{n}_i$" with -- $\tilde{h}_{0,i} = h_{0,i} - F_0^\dagger C_{0,i}^H F_1 F_1^\dagger C_{1,i}^H C_{0,i} F_0 h_{0,i} + \dot{n}_i$ --.

In Column 10, Line 5, please replace "$RSRP = 1/M \sum_{i=0}^{M-1} \tilde{h}_{0,1}^{-H}(I - B_i)^{-H} F_0^h F_0 (I - B_i)^{-1} \tilde{h}_{0,i} - g\sigma^2$" with -- $SRP = \frac{1}{M} \sum_{i=0}^{M-1} \tilde{h}_{0,1}^{-H}(I - B_i)^{-H} F_0^h F_0 (I - B_i)^{-1} \tilde{h}_{0,i} - g\sigma^2$ --.

In Column 11, Line 12, please replace "$\tilde{h}_{0,i} = h_{0,i} - F_0^\dagger C_{0,i}^H F_1 F_1^` C_{1,i}^H C_{0,i} F_0 h_{0,i} + \dot{n}_i$" with -- $\tilde{h}_{0,i} = h_{0,i} - F_0^\dagger C_{0,i}^H F_1 F_1^\dagger C_{1,i}^H C_{0,i} F_0 h_{0,i} + \dot{n}_i$ --.

Signed and Sealed this
Twenty-first Day of May, 2019

Andrei Iancu
*Director of the United States Patent and Trademark Office*